United States Patent [19]
Mansfield et al.

[11] Patent Number: 5,863,244
[45] Date of Patent: Jan. 26, 1999

[54] AGENT AND METHOD FOR TREATING AND BLANCHING POULTRY PAWS

[75] Inventors: W. David Mansfield, Pensacola, Fla.; W. David Mansfield, Jr., Baker, La.

[73] Assignee: Applied Solutions, Inc., Baker, La.

[21] Appl. No.: 911,249

[22] Filed: Aug. 15, 1997

[51] Int. Cl.$^6$ .................................................... A22B 5/08
[52] U.S. Cl. ............................................ 452/74; 452/198
[58] Field of Search ................................... 452/198, 173, 452/71, 74

[56] References Cited

U.S. PATENT DOCUMENTS

| | | | |
|---|---|---|---|
| 4,102,015 | 7/1978 | Herrick | 452/75 |
| 4,683,618 | 8/1987 | O'brien | 452/75 |
| 4,849,237 | 7/1989 | Hurst | 426/332 |
| 5,512,309 | 4/1996 | Bender et al. | 426/332 |

*Primary Examiner*—Willis Little
*Attorney, Agent, or Firm*—Roy, Kiesel & Tucker, PLC

[57] ABSTRACT

A method for simultaneously clarifying lesions on poultry paws and for blanching or whitening poultry paws is disclosed. The paws are steamed for about fifteen seconds. Next they are soaked in an aqueous solution of hydrogen peroxide for about twenty minutes. The hydrogen peroxide preferably comprises about 2.0% of the solution by volume and the solution preferably has a pH of between about 9.6 and about 10.6. The solution should also preferably contain about 100 ppm of a food grade surfactant suitable for dissolving oils into water. An anti-foam agent may also be included in the solution. After soaking, the skin of the paws is preferably removed, most preferably by subjecting the paws to rotating rubber fingers. When the process is complete, the paws are substantially white, and any lesions that may have been present are substantially clear. Additionally, the process will cause the paws to absorb water which will make them heavier.

38 Claims, No Drawings

AGENT AND METHOD FOR TREATING AND BLANCHING POULTRY PAWS

FIELD OF THE INVENTION

The invention relates generally to the processing of poultry paws or feet, and more particularly to the clarification of urea sores on and the blanching or whitening of poultry paws.

BACKGROUND OF THE INVENTION

Poultry paws, the portion of the leg below the feather line, have three principal grades, condemned grade, sub-grade, and A grade. Condemned grade paws are used primarily as a component in animal feeds. Sub-grade and A grade paws are used principally for human consumption. The principal market for poultry paws for non-animal food purposes is in Asia. The difference in price per pound between condemned grade paws and sub-grade or A grade paws can range from 400 to 800%. Therefore, it is commercially advantageous to minimize the number of paws that are classed as condemned grade. Similarly, it is desirable to maximize the number of paws that are classed as A grade.

One of the principal factors which can cause a paw to be graded below A grade is the presence of dark sores on the paw. In chickens, these sores or lesions often are urea burns that arise from contact between the chicken and its own feces. In the prior art, certain methods have been used to prevent the ammonia burns from occurring, including treating the chicken houses with ammonium bisulfate or dilute phosphoric acid in order to reduce the corrosive nature of the ammonia present. Bacterial treatment of the ammonia has also been used. These methods are all preventative in nature. The inability to remove the dark clotted blood associated with these lesions after they have formed often results in the paw being ground into cat food.

Another factor which can result in the down grading of poultry paws is color. Demand for white paws far exceeds the demand for black paws because of consumer perception that is apparently not founded in any objective taste, texture or nutritional characteristic of the paw. Unfortunately for poultry processors, several commercially significant chicken varieties have black paws, substantially all of which are currently sold solely as condemned grade.

A third factor that can result in a condemned grade is deformities of the paw. Of the three factors discussed above, it is the only one which cannot be at least partially treated by the method disclosed herein. Fortunately, deformed paws comprise less than ten percent of the annual chicken paw crop.

OBJECTS OF THE INVENTION

It is an object of the invention to clarify lesions on poultry paws.

It is another object of the invention to blanch or whiten poultry paws.

It is yet another object of the invention to minimize the number of poultry paws which must be sold as condemned grade paws.

It is yet another object of the invention to maximize the number of poultry paws which may be sold as A grade paws.

It is yet another object of the invention to maximize the weight of poultry paws.

It is still another object of the invention to maximize the value of poultry paws.

SUMMARY OF THE INVENTION

A preferred embodiment of the invention comprises the treatment of poultry paws for about 20 minutes with a 2.0% (by volume) solution of hydrogen peroxide and a surfactant at a pH from about 9.6 to about 10.6. The surfactant should preferably be about 100 to 133 ppm and should most preferably be a polyglycerol oleate or other food grade surfactant. The surfactant, and any free hydroxide ions present in the solution saponify and emulsify the hydrophobic outer layer of the skin of the paw. This allows the hydrogen peroxide to pass through the outer layer of the skin to reach the sore. There the hydrogen peroxide oxidizes the dried blood and other organic residue, causing it to become water soluble. The oxidized blood will then dissolve in the solution leaving a clear place in the skin which before was occupied by a dark clot.

The same solution also blanches or whitens dark poultry paws. The inventor believes that the hydrogen peroxide oxidizes the melanin and other pigments in the skin of the paws. It is believed that after the pigments have been oxidized, they too are solubilized. Regardless of the chemical process actually taking place, the skin left behind is substantially white. Another advantage to the invention is that the paws will absorb water during the process, which will increase their weight. The paws are sold by weight, so this will increase their value.

DETAILED DESCRIPTION OF THE INVENTION

As discussed above, poultry paws often have lesions or urea burns on them. The dark color associated with these lesions is largely a function of blood and other organic matter that have dried into a solid crystalline mass. The invention comprises using hydrogen peroxide [$H_2O_2$] to clarify these lesions by removing these dark crystalline masses which make the paw unsightly and thus unusable for human consumption. Hydrogen peroxide is a strong oxidizing agent which will react with numerous different organic components present in the lesion. In addition, iron which is present in the hemoglobin in blood can act as a catalyst for the disassociation of hydrogen peroxide into water and oxygen as given below.

$$H_2O_2(l) \rightarrow H_2O(l) + O_2(g)$$

These reactions may clarify the lesion in several ways. First, the oxidation of the organic components of the mass may render them more soluble in aqueous solutions. Second, the production of gaseous oxygen from the disassociation of the hydrogen peroxide will result in bubbles being created in the lesion itself. The effervescence of the solution in the lesion may physically break up the mass, creating smaller pieces which may be more easily dissolved and/or washed out of the lesion. Finally, the reaction between the hydrogen peroxide and components of the mass may sufficiently alter the crystalline structure of the mass to cause it to disassociate. Regardless of the mechanics of the process, the hydrogen peroxide solution removes the dark mass leaving behind a clear spot in the skin where before there had been an unsightly clot.

In order for the hydrogen peroxide to clarify the lesion, it must first come into contact with the lesion. This is partially impeded by the outer layer of skin on the paw. On this outer layer of skin is a barrier comprised of small particles of oil and fat which are generally negatively charged. This barrier is quite hydrophobic and will retard contact between the aqueous solution and the skin of the paw. To overcome this barrier, the inventor contemplates using a surfactant.

Surfactants are compounds that alter (usually reduce) the surface tension of water. They may be ionic or nonionic. Surfactants have a hydrophilic generally polar end and a hydrophobic generally non-polar end. The hydrophilic end allows the compound to be soluble in water while the hydrophobic end allows the compound to be soluble in oils. Typically, surfactants are also able to neutralize charged particles. All of these characteristics facilitate the emulsification of oils into an aqueous solution. By emulsifying the oils and fats in the hydrophobic outer layer of skin present on the paw, the surfactant allows the hydrogen peroxide access to the lesion.

In selecting a surfactant, the principal criteria used to evaluate its suitability is the value given to the surfactant under the Atlas HLB system. HLB stands for "hydrophilic lipophilic balance." The HLB number is a measure of the hydrophilic and lipophilic tendencies of the surfactant. The values indicate how well the surfactant is expected to perform the various tasks surfactants are used to perform, such as dissolving waters into oils, dissolving oils into waters, or serving as a wetting agent, a detergent, or a solubilizer. The inventors are using the surfactant in the present invention to dissolve oils into waters and thus expect an HLB number of between 8 and 18 to be preferred.

A wide variety of surfactants are available, and are believed to be applicable to the invention. Some typical surfactant producing reagents are given in table A.

TABLE A

| Hydrophobic Components | Hydrophilic Components |
| --- | --- |
| polyglycerides; | carboxylates |
| particularly triglycerides | quaternary ammonium |
| sorbitol | phosphates |
| glycol | hydroxyls |
| glycerol | alcohols |
| fatty acids | sulphonates |
| lauryl acid | ethylene oxides |
| oleic acid | |
| cetyl acid | |
| palmitic acid | |

Given the intended purpose of the invention, it would be preferable to use a surfactant which was suitable for contact with food. Table B lists surfactants which the inventor believes would satisfy this preference. This table is intended to be illustrative rather than exclusive. Those marked with an asterisk (*) are believed to be currently in use in the processing of food for human consumption.

TABLE B

| Surfactants | | |
| --- | --- | --- |
| lauryl sulfates | alkyl ether sulfates | alpha olefin sulfonates |
| ammonium salts | ammonium salts | sodium salts |
| sodium salts | sodium salts | |
| amine salts | | |
| linear alkyl benzene sulfonates | alkanolamides | ethoxylated |
| | | alkanolamides |
| amine salts | amine salts | |
| cationics | alcohol esters | glycerol esters* |
| centrimonium chlorides | isopropyls | oleates* |
| stearalkonium chloride | octyls | dilaurates* |
| olealkonium chloride | cetyls | stearates* |

TABLE B-continued

| Surfactants | | |
| --- | --- | --- |
| dicetyl dimethyl ammonium chloride dipalmitoylethyl hydroxethylmonium methosulfate | isocetyls | distrearates* |
| betains | sarcosinates | sulfo acetates |
| | sodium salts | sodium lauryl salts |
| sulfo succinates | glycol esters* | specialty surfactants |
| sodium lauryl salts | stearates* distearates* distearamides* | ditallowpthalic acid amides* distearylpthalic acid amides* cetyl alcohol caprylic triglyceride Carbo Wax ™ of Union Carbide, food grade embodiments |
| polyethylene glycol esters* | | |
| laurates* | | |
| dilaurates* | | |
| oleates* | | |
| dioleates* | | |
| stearates* | | |
| distrearates* | | |
| polyglycerol oleates* | | |
| polyglycerol tetraoleates* | | |
| polyglycerol decaoleates* | | |

The minimum quantity of surfactant needed is quite low, 25 ppm or less, although this may vary somewhat with the surfactant. In testing, the inventor used a polyglycerol oleate at between 100 to 133 ppm. Higher concentrations would be expected to perform adequately; however, it is preferable to minimize surfactant quantities. First, many surfactants foam with agitation. This is preferably avoided. Second, significant amounts of surfactant may leave a residue on the paws, possibly imparting an undesirable soapy taste. Finally, simple economics dictate minimization of components.

The surfactant(s) used will allow the hydrogen peroxide to penetrate the hydrophobic outer layer of skin. Additionally, the hydrogen peroxide should be able to oxidize the particles once the charge has been removed. This is believed to further increase their solubility in water. The neutralization, emulsification, and/or dissolution of the fat and oil particles will allow the hydrogen peroxide to penetrate the skin and attack the lesion.

Because of its unstable nature, hydrogen peroxide is not commercially available as a simple aqueous solution of $H_2O_2$ and water. Instead, the hydrogen peroxide must be stabilized, usually by adding an acid, often phosphoric acid. The inventor has successfully used a stabilized food grade hydrogen peroxide solution commercially available from Eka Chemicals of 1519 Johnson Ferry Road, Marietta, Ga., USA. Eka is a subsidiary of Akzo Nobel. The Eka stabilized hydrogen peroxide is an aqueous solution containing approximately 35% $H_2O_2$ by volume and has a pH of about 2 or less.

The process solution should preferably be comprised of between about 2.0 and 3.0% hydrogen peroxide by volume. This may be obtained by making a solution that is 6% by volume of a stabilized 35% hydrogen peroxide solution such as the Eka product.

An aqueous solution as described above will have a pH that is significantly lower than the desired 9.6 to 10.6. At this level of acidity, the ability of the hydrogen peroxide to act as an oxidizing agent will be severely inhibited. Additionally, the solution would be corrosive to the flesh of the poultry paw which can result in damage to the paw. Therefore, the pH should be raised to allow the hydrogen peroxide to be sufficiently reactive while preventing the solution from being overly corrosive. This is accomplished by adding a base to the solution until the desired pH is reached. In his preferred embodiment, the inventor contemplates using a source of hydroxide ions such as a food grade, membrane cell, caustic soda that is 50% NaOH by volume such as is available from Formosa Chemicals at their Point Comfort, Tex. facility.

The hydroxide ion source also serves a secondary function in addition to regulating pH: helping the solution penetrate the hydrophobic outer layer of skin on the paw. The hydroxide ions will saponify the oil and fat particles discussed above, converting them into water soluble soaps. The aqueous solution bearing the hydrogen peroxide can pass through and/or remove the soaps to reach the skin, and clarify the lesions. However, free hydroxide ions are not available in aqueous solutions until a pH of about 9.6 is obtained. At pH's up to about 10.6, the base provides this secondary saponification function without adverse consequences. At pH's above 10.6, excess saponification occurs, leaving an undesirable slick soapy film on the paw. At pH's above 12.5, tissue damage to the paw occurs. Therefore, it is preferable to maintain pH levels between 9.6 and 10.6. The foregoing observations are based upon a 20 minute soak time. The upper limit of the pH range may be increased by reducing the soak time. Additionally, a wash with a mild acid such as vinegar would likely eliminate the soapy film. Similarly, the lower limit of the pH range may be extended by lengthening the soak time.

A practical problem arises from the saponification of the fats and oils in the paws and also from the surfactant in the solution. Both can lead to the presence of foam. Therefore, it is preferable to add an anti-foam agent to the solution. Preferably this would be a silicone based product such as Dow Corning's FG-10 Antifoam Emulsion, available from the Health and Environmental Sciences division of Dow Corning at 2200 W. Salzburg Rd., Midland, Mich. 48686-0994. This product contains water, polydimethylsiloxane, stearate emulsifiers, silicone, benzoic acid, xanthum gum, sorbic acid, and sulfuric acid in unspecified proportions. It's active ingredients comprise ten percent of the solution. FDA regulations (21 C.F.R. § 173.340) prevent the use of antifoam agents for processing food such that the concentration of polydimethylsiloxane in the food is above 10 ppm. Anti-foam concentrations of 10 ppm in the solution are expected to be adequate. However, higher concentrations, between about 0.05 percent (about 127 ppm) and about 0.5 percent by volume (about 1150 ppm), are expected to be preferred. Higher concentrations may be used if necessary; provided the concentration of polydimethylsiloxane in the paw is kept within FDA limits. If a non-silicone based anti-foam agent were determined to be suitable, higher concentrations might be used if necessary.

In addition to its function in clarifying the lesion on the poultry paws, the hydrogen peroxide will also perform an additional task of blanching or whitening the paws. The hydrogen peroxide is believed to oxidize the melanin and other pigments in the skin. These pigments then either lose their coloration or are extracted from the skin, leaving a white paw.

It should be noted that the ability of the process to blanch the paws of poultry has a significance that is independent of the ability of the process to clarify lesions. Currently, the paws of black footed chickens are generally used only for animal food, regardless of the condition of the paws. Thus, thousands of pounds of paws which would, but for their color, be fit for human consumption are ground into cat food every year. If these paws could be sold as A grade paws, their value could be increased as much as 800% per pound. For the healthy black paws that do not have sores that need to be cleaned, the only impediment to this upgrade is their color. The process removes that impediment.

An additional benefit provided by the process is the uptake of water by the paws. Chicken paws that were treated with the process were observed to increase in weight due to the uptake of water during the treatment an average of twelve percent. Uptakes as high as twenty percent were observed. This is significant because the paws are sold by the pound. An increase in weight is, therefore, equivalent to an increase in value.

In operation the inventor expects to steam the paws for about 15 seconds. The paws will then be soaked in an aqueous solution of between about 2.0 and 3.0% food grade hydrogen peroxide by volume. The solution should preferably have a pH of between about 9.6 and about 10.6. The pH will preferably be regulated by a hydroxide source such as sodium hydroxide. The addition of about 0.5% by volume of 50% NaOH food grade caustic soda is expected to be sufficient to achieve the desired pH when the hydrogen peroxide is provided in a stabilized form having a pH of about 2. The solution will preferably contain about 100 to 133 ppm of a surfactant such as Drewpol 10-1-CCK, available from Stepan Company, 100 West Hunter Avenue, Maywood, N.J., 07607. This product contains nonethoxylated polyglycerol esters and is approved for use as an emulsifier in food pursuant to 21 C.F.R. § 172.854. It is nonionic, and it has a an HLB value of 14.5, a saponification value of 100, and a hydroxyl value of 644. The solution will also preferably contain about 0.05 and 0.5 percent by volume of an anti-foam agent such as the Dow Corning product previously discussed. The paws will be soaked in the solution for about 15 to 60 minutes and most preferably about 20 minutes. About 30 ml of solution are expected to be needed per paw. This is based upon the observation that one 300 ml solution will treat approximately 10 paws in succession. However, at pH's above about 4.3, hydrogen peroxide is increasingly unstable (and also an increasingly stronger oxidizing agent). The $H_2O_2$ will constantly break down into $H_2O$ and $O_2$. Therefore, it is not clear if the reaction with the paws is the limiting factor in the life of the reagent or if it is simply time. Less than 30 ml may be needed if the paws are treated at once.

Similarly, optimal temperature and agitation rates have not been determined. Cooler temperatures (around 40°–50° F.) are expected to be most compatible with the processing of the paws and are also expected to facilitate dissolution of the surfactant into the solution. An increase in temperature will make the reactions go faster; however, it will also cause the active ingredients in the solution to be consumed more rapidly. Similarly, agitation will increase the rate of reaction but will also increase the rate of reagent consumption. Agitation will also have a secondary drawback in that it will promote the creation of foam. The optimal temperature and agitation level will depend upon the particular processing operation in which invention is used. The inventors expect a temperature of between about freezing and about 50° F., and most preferably about 40° F. to be optimal. The inventors also expect minimal to no agitation to be preferred.

After soaking, the paws will be hit with rotating or vibrating rubber fingers which will remove the skin. A substantially white paw with substantially clear lesions, if any, will be produced. The paw will also have increased in weight.

Other uses and embodiments of the invention will occur to those skilled in the art from the foregoing disclosure and from the following examples, and are intended to be included within the scope and spirit of the claims which follow.

EXAMPLE 1

Eighteen aqueous solutions of acid stabilized hydrogen peroxide were prepared. The hydrogen peroxide content ranged from 0.0 to 2.67 percent by volume. Hydrogen peroxide content was increased 0.17 percent in each successive solution. Each solution was further separated into three separate 300 ml solutions. These solutions differed in that each was comprised of a different percentage of NaOH and thus each had a different pH. The three quantities of NaOH used were 0.5, 0.3, and 0.17 percent by volume. Each solution was ice chilled before soaking. The composition of the solutions is described in the following table.

TABLE C

| Solution | % $H_2O_2$ | pH (0.5% NaOH) | pH (0.3% NaOH) | pH (0.17% NaOH) |
|---|---|---|---|---|
| 1 | 0 | 12.00 | 11.90 | 11.80 |
| 2 | 0.17 | 11.90 | 11.90 | 11.80 |
| 3 | 0.33 | 11.80 | 11.60 | 11.60 |
| 4 | 0.50 | 11.80 | 11.60 | 11.40 |
| 5 | 0.67 | 11.70 | 11.30 | 11.20 |
| 6 | 0.83 | 11.70 | 10.90 | 10.80 |
| 7 | 1.00 | 11.60 | 10.80 | 10.70 |
| 8 | 1.17 | 11.40 | 10.70 | 10.60 |
| 9 | 1.33 | 11.20 | 10.60 | 10.50 |
| 10 | 1.50 | 11.00 | 10.50 | 10.20 |
| 11 | 1.67 | 10.60 | 10.30 | 10.10 |
| 12 | 1.83 | 10.50 | 10.10 | 9.90 |
| 13 | 2.00 | 10.40 | 10.00 | 9.80 |
| 14 | 2.10 | 10.40 | 9.90 | 9.80 |
| 15 | 2.17 | 10.40 | 9.80 | 9.70 |
| 16 | 2.33 | 10.30 | 9.70 | 9.60 |
| 17 | 2.50 | 10.20 | 9.70 | 9.50 |
| 18 | 2.67 | 10.10 | 9.60 | 9.40 |

Fifty-four black, substantially sore-free, chicken paws were first steam scalded for approximately fifteen seconds and then soaked for approximately twenty minutes in the above described solutions. After twenty minutes, all the paws except those soaked in solution 1, were noticeably lighter. The paws in tests 11–18 were substantially fully white at the end of twenty minutes. The paws in tests where the pH was greater than 10.60 (1–7, and parts of 8–10) exhibited a detectable soapy feeling indicating excess saponification.

EXAMPLE 2

Two 300 ml aqueous solution was prepared comprising 1.0 percent $H_2O_2$ and 3.0 percent NaOH by volume. A surfactant contained in a dimethylpolysiloxane anti-foam agent available from Dow Corning under the trade name FG-10 was added to the solution until the surfactant comprised about 133 ppm of the solution. The surfactant is a "stearate emulsifier" and comprises about 2% of the anti-foam product. The anti-foam made up about 0.5 percent by volume of the solution. The pH of this solution was not measured; however, based upon the measurements illustrated in Table C, it is estimated to have been about 13 to 14. Each solution was chilled with ice during soaking.

Two chicken paws, each having several black urea burns, and each having been steamed for approximately 15 seconds, were soaked in the solutions for between one and two hours. After soaking, both paws were substantially fully white and the sores had been substantially clarified. However, the paws had a slick feeling and needed a mild acid rinse. Additionally, these paws were observed to increase in weight 0.25 ounces.

EXAMPLE 3

A 300 ml solution was prepared comprising 2.0 percent $H_2O_2$ and 2.0 percent NaOH by volume. Approximately 266 ppm of surfactant as described in example 2 were added to the solution (1.0% anti-foam). Again, the pH was not measured, but it is estimated to have been about 12.5 to 13.5. The solution was ice chilled before soaking.

One chicken paw having several black urea burns and having been steamed for approximately 15 seconds was soaked in the solution for about one hour. After soaking, the paw was substantially fully white and the sores had been substantially clarified. The slick feeling noted in example 2 had been substantially diminished.

EXAMPLE 4

A 300 ml solution was prepared comprising 2.0 percent $H_2O_2$ and 1.0 percent NaOH by volume. Approximately 266 ppm of surfactant as described in example 2 were added to the solution (1.0% anti-foam). Again, the pH was not measured, but it is estimated to have been about 11 to 12. The solution was ice chilled before soaking.

One chicken paw having several black urea burns and having been steamed for approximately 15 seconds was soaked in the solution for about one hour. After soaking, the paw was substantially fully white and the sores had been substantially clarified. Only a slight slick feeling was detected.

EXAMPLE 5

A 300 ml solution was prepared comprising 2.0 percent $H_2O_2$ and 0.5 percent NaOH by volume. Approximately 266 ppm of surfactant as described in example 2 were added to the solution (1.0% anti-foam). Again, the pH was not measured, but it is estimated to have been about 10.0 to 10.5. The solution was ice chilled before soaking.

One chicken paw having several black urea burns and having been steamed for approximately 15 seconds was soaked in the solution for less than one hour. After soaking, the paw was substantially fully white and the sores had been substantially clarified. No slick feeling was detected.

EXAMPLE 6

A 300 ml solution was prepared comprising 2.0 percent $H_2O_2$ and 0.5 percent NaOH by volume. Approximately 133 ppm of surfactant as described in example 2 were added to the solution (0.5% anti-foam). Again, the pH was not measured, but it is estimated to have been about 10.0 to 10.5. The solution was ice chilled before soaking.

One chicken paw having several black urea burns and having been steamed for approximately 15 seconds was soaked in the solution for less than one hour. After soaking, the paw was substantially fully white and the sores had been substantially clarified. No slick feeling was detected.

EXAMPLE 7

A 300 ml solution was prepared comprising 3.0 percent $H_2O_2$ and 0.5 percent NaOH by volume. Approximately 133 ppm of surfactant as described in example 2 were added to the solution (0.5% anti-foam). Again, the pH was not measured, but it is estimated to have been about 9.70 to 9.90. The solution was ice chilled before soaking.

One chicken paw having several black urea burns and having been steamed for approximately 15 seconds was soaked in the solution for about twenty minutes. After soaking, the paw was substantially fully white and the sores had been substantially clarified.

EXAMPLE 8

Two 300 ml aqueous solution was prepared comprising 1.0 percent $H_2O_2$ and 3.0 percent NaOH by volume. Approximately 133 ppm of surfactant as described in example 2 were added to the solution (0.5% anti-foam). Again, the pH was not measured, but it is estimated to have been about 9.70 to 9.90. The solution was ice chilled before soaking.

Two black substantially sore free chicken paws, each having been steamed for approximately 15 seconds, were soaked in the solutions for twenty minutes. After soaking, the paws were substantially fully white.

We claim:

1. A method for clarifying lesions on poultry paws comprising:
    scalding said paws; and
    soaking said paws in an aqueous solution comprising hydrogen peroxide and a surfactant capable of overcoming the hydrophobic protective layer of said poultry paws.
2. A method for clarifying lesions on poultry paws according to claim 1 wherein said aqueous solution has a pH of at least about 9.6.
3. A method for clarifying lesions on poultry paws according to claim 2 wherein said aqueous solution has a pH of less than about 10.6.
4. A method for clarifying lesions on poultry paws according to claim 1 wherein said solution contains at least about 25 ppm of said surfactant.
5. A method for clarifying lesions on poultry paws according to claim 4 wherein said aqueous solution has a pH of at least about 9.6.
6. A method for clarifying lesions on poultry paws according to claim 5 wherein said aqueous solution has a pH of less than about 10.6.
7. A method for clarifying lesions on poultry paws according to claim 1 wherein said solution contains at least about 100 ppm of said surfactant.
8. A method for clarifying lesions on poultry paws according to claim 7 wherein said aqueous solution has a pH of at least about 9.6.
9. A method for clarifying lesions on poultry paws according to claim 8 wherein said aqueous solution has a pH of less than about 10.6.
10. A method for clarifying lesions on poultry paws according to claims 1, 2, 3, 4, 5, 6, 7, 8, or 9 wherein said hydrogen peroxide comprises between about 0.5 and 3.0 percent of said solution by volume.
11. A method for clarifying lesions on poultry paws according to claim 10 wherein said surfactant has an HLB number of between about 8 and about 18.
12. A method for clarifying lesions on poultry paws according to claim 10 wherein said hydrogen peroxide comprises about 2.0 percent of said solution by volume.
13. A method for clarifying lesions on poultry paws according to claim 12 wherein said surfactant has an HLB number of between about 8 and about 18.
14. A method for clarifying lesions on poultry paws according to claims 1, 2, 3, 4, 5, 6, 7, 8, or 9 wherein said surfactant has an HLB number of between about 8 and about 18.
15. A method for clarifying lesions on poultry paws according to claim 1 wherein said paws are scalded with steam.
16. A method for clarifying lesions on poultry paws according to claim 15 wherein said paws are scalded for about 15 seconds.
17. A method for clarifying lesions on poultry paws according to claim 1 further comprising removing the skin from said paws.
18. A method for clarifying lesions on poultry paws according to claim 17 wherein said skin is removed by subjecting said paws to rotating rubber fingers.
19. A method for clarifying lesions on poultry paws according to claims 15, 16, 17, or 18 wherein said surfactant has an HLB number of between about 8 and about 18.
20. A method of blanching poultry paws comprising:
    scalding said paws; and
    soaking said paws in an aqueous solution comprising hydrogen peroxide.
21. A method of blanching poultry paws according to claim 20 wherein said aqueous solution has a pH of at least about 9.6.
22. A method of blanching poultry paws according to claim 21 wherein said aqueous solution has a pH of less than about 10.6.
23. A method of blanching poultry paws according to claim 20 wherein said solution contains at least about 25 ppm of a surfactant capable of overcoming the hydrophobic protective layer of said poultry paws.
24. A method of blanching poultry paws according to claim 23 wherein said aqueous solution has a pH of at least about 9.6.
25. A method of blanching poultry paws according to claim 24 wherein said aqueous solution has a pH of less than about 10.6.
26. A method of blanching poultry paws according to claim 20 wherein said solution contains at least about 100 ppm of said surfactant.
27. A method of blanching poultry paws according to claim 26 wherein said aqueous solution has a pH of at least about 9.6.
28. A method of blanching poultry paws according to claim 27 wherein said aqueous solution has a pH of less than about 10.6.
29. A method of blanching poultry paws according to claims 20, 21, 22, 23, 24, 25, 26, 27 or 28 wherein said hydrogen peroxide comprises between about 0.5 and about 3.0 percent of said solution by volume.
30. A method of blanching poultry paws according to claim 29 further comprising a surfactant having an HLB number of between about 8 and about 18.
31. A method of blanching poultry paws according to claim 29 wherein said hydrogen peroxide comprises about 2.0 percent of said solution by volume.
32. A method of blanching poultry paws according to claim 31 further comprising a surfactant having an HLB number of between about 8 and about 18.
33. A method of blanching poultry paws according to claims 20, 21, 22, 23, 24, 25, 26, 27 or 28 further comprising a surfactant having an HLB number of between about 8 and about 18.

34. A method of blanching poultry paws according to claim 20 wherein said paws are scalded with steam.

35. A method of blanching poultry paws according to claim 34 wherein said paws are scalded for about 15 seconds.

36. A method of blanching poultry paws according to claim 20 further comprising removing the skin from said paws.

37. A method of blanching poultry paws according to claim 36 wherein said skin is removed by subjecting said paws to rotating rubber fingers.

38. A method of blanching poultry paws according to claims 34, 35, 36 or 37 further comprising a surfactant having an HLB number of between about 8 and about 18.

\* \* \* \* \*